United States Patent
Kharel et al.

(10) Patent No.: US 12,538,328 B2
(45) Date of Patent: Jan. 27, 2026

(54) UE-ASSISTED DUMMY DCI USAGE REDUCTION IN PDCCH SKIP

(71) Applicant: QUALCOMM Incorporated, San Diego, CA (US)

(72) Inventors: Amrit Kharel, San Diego, CA (US); Marcelo Schiocchet, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/477,348

(22) Filed: Sep. 28, 2023

(65) Prior Publication Data

US 2025/0113367 A1 Apr. 3, 2025

(51) Int. Cl.
*H04W 72/232* (2023.01)
*H04W 52/02* (2009.01)
*H04W 72/1268* (2023.01)

(52) U.S. Cl.
CPC ..... *H04W 72/232* (2023.01); *H04W 52/0261* (2013.01); *H04W 72/1268* (2013.01)

(58) Field of Classification Search
CPC ........... H04W 72/232; H04W 52/0261; H04W 72/1268
See application file for complete search history.

(56) References Cited

U.S. PATENT DOCUMENTS

| | | | | |
|---|---|---|---|---|
| 9,609,662 B2 * | 3/2017 | Deng | | H04W 72/23 |
| 11,071,132 B2 * | 7/2021 | Takeda | | H04W 72/1268 |
| 11,979,863 B2 * | 5/2024 | Choi | | H04W 72/23 |
| 12,167,464 B2 * | 12/2024 | Shen | | H04W 52/50 |
| 12,256,265 B2 * | 3/2025 | Chen | | H04L 1/189 |
| 2020/0267749 A1 * | 8/2020 | Al-Imari | | H04W 16/14 |
| 2022/0312463 A1 * | 9/2022 | Niu | | H04W 52/0235 |
| 2023/0262599 A1 * | 8/2023 | Jung | | H04L 5/0007 370/311 |
| 2023/0319848 A1 * | 10/2023 | Zhou | | H04L 5/0053 370/329 |
| 2023/0337240 A1 * | 10/2023 | Zhang | | H04W 72/566 |
| 2023/0354364 A1 * | 11/2023 | Guo | | H04W 72/232 |
| 2024/0073887 A1 * | 2/2024 | Bae | | H04W 72/1268 |
| 2024/0305413 A1 * | 9/2024 | Al-Imari | | H04W 72/1268 |
| 2025/0113363 A1 * | 4/2025 | Saeed | | H04W 72/1268 |
| 2025/0212215 A1 * | 6/2025 | Nam | | H04W 52/0235 |

* cited by examiner

*Primary Examiner* — Jael M Ulysse
(74) *Attorney, Agent, or Firm* — Procopio, Cory, Hargreaves & Savitch LLP

(57) ABSTRACT

Apparatus, methods, and computer program products for wireless communication are provided. An example method may include receiving, from a network node, DCI including a command to skip monitoring for PDCCH for a period of time. The example method may further include transmitting, to the network node during the period of time, at least one SR to schedule at least one PUSCH transmission for uplink data transmission at the UE. The example method may further include monitoring and receiving at least one PDCCH transmission from the network node to schedule the at least one PUSCH transmission. The example method may further include transmitting, to the network node, the at least one PUSCH transmission. The example method may further include transmitting, at an end of the uplink data transmission, an indication to skip monitoring for the PDCCH in a last PUSCH transmission of the at least one PUSCH transmission.

30 Claims, 11 Drawing Sheets

UE-ASSISTED DUMMY DCI USAGE REDUCTION IN PDCCH SKIP

TECHNICAL FIELD

The present disclosure relates generally to communication systems, and more particularly, to wireless communication systems with monitoring for physical downlink control channel (PDCCH) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on information stored in the at least one memory, the at least one processor, individually or in any combination, is configured to receive, from a network node, downlink control information (DCI) including a command to skip monitoring for physical downlink control channel (PDCCH) for a period of time. Based at least in part on information stored in the at least one memory, the at least one processor, individually or in any combination, is configured to transmit, to the network node during the period of time, at least one scheduling request (SR) to schedule at least one physical uplink shared channel (PUSCH) transmission for uplink data transmission at the UE. Based at least in part on information stored in the at least one memory, the at least one processor, individually or in any combination, is configured to monitor and receive at least one PDCCH transmission from the network node to schedule the at least one PUSCH transmission. Based at least in part on information stored in the at least one memory, the at least one processor, individually or in any combination, is configured to transmit, to the network node, the at least one PUSCH transmission. Based at least in part on information stored in the at least one memory, the at least one processor, individually or in any combination, is configured to transmit, at an end of the uplink data transmission, an indication to skip monitoring for the PDCCH in a last PUSCH transmission of the at least one PUSCH transmission.

In another aspect of the disclosure, a method, a computer-readable medium, and an apparatus at a network entity are provided. The apparatus may include at least one memory and at least one processor coupled to the at least one memory. Based at least in part on information stored in the at least one memory, the at least one processor, individually or in any combination, is configured to transmit, for a UE, DCI including a command to skip monitoring for PDCCH for a period of time. Based at least in part on information stored in the at least one memory, the at least one processor, individually or in any combination, is configured to receive, during the period of time, at least one SR to schedule at least one PUSCH transmission for uplink data transmission at the UE. Based at least in part on information stored in the at least one memory, the at least one processor, individually or in any combination, is configured to transmit at least one PDCCH transmission for the UE to schedule the at least one PUSCH transmission. Based at least in part on information stored in the at least one memory, the at least one processor, individually or in any combination, is configured to receive the at least one PUSCH transmission. Based at least in part on information stored in the at least one memory, the at least one processor, individually or in any combination, is configured to receive, at an end of the uplink data transmission, an indication to skip monitoring for the PDCCH in a last PUSCH transmission of the at least one PUSCH transmission.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
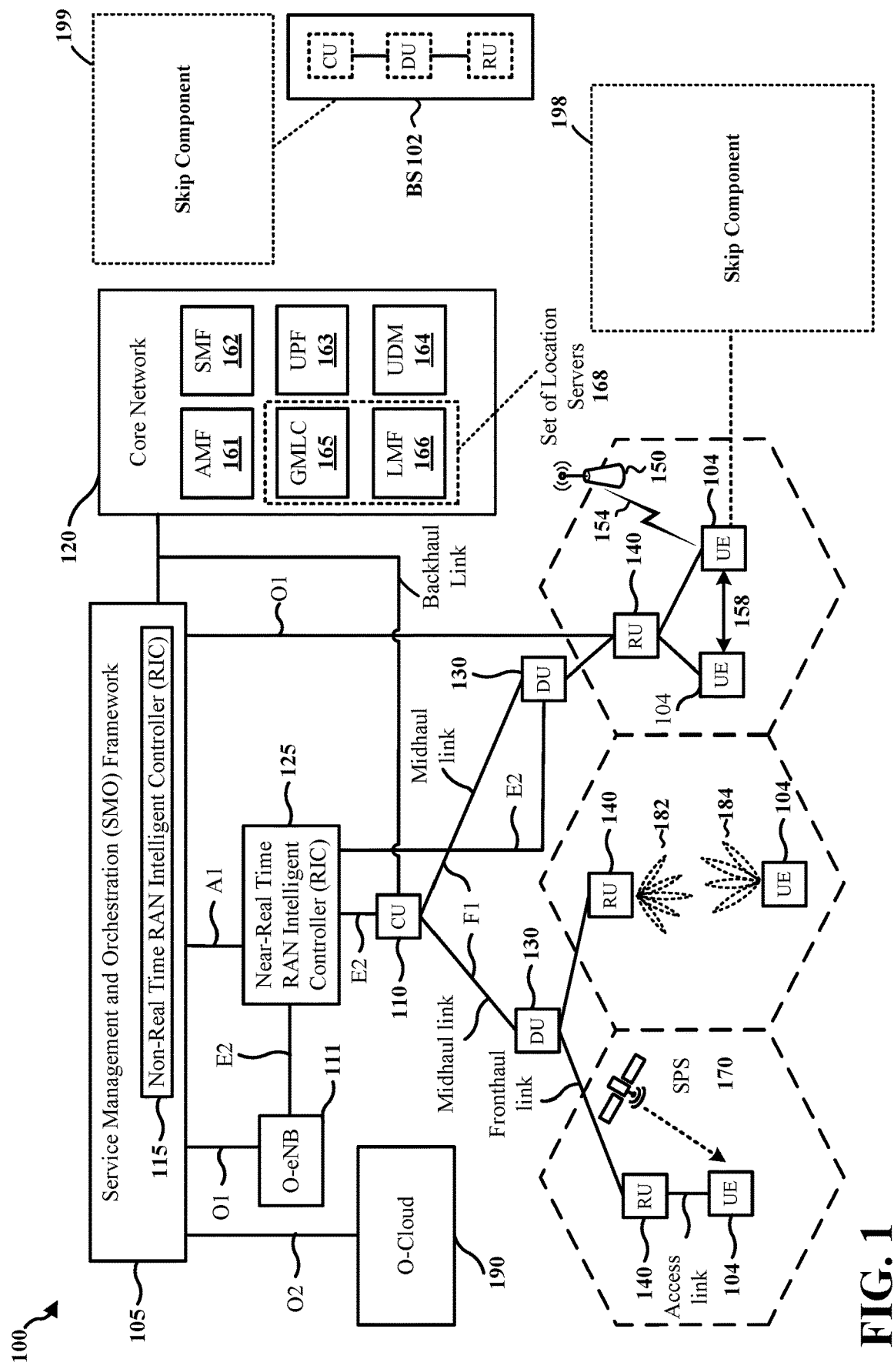
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Physical downlink control channel (PDCCH) skipping, e.g., in which a UE skips monitoring for PDCCH transmissions, based on an indication received in a dedicated downlink control information (DCI) may facilitate power saving at the UE. As an example, a UE may save 15% and 26% of power by skipping monitoring for PDCCH during a skip duration of 5 and 10 milliseconds, respectively. However, to facilitate such PDCCH skipping, different dedicated DCI may be transmitted for different UE, which may consume a large amount of resources and potentially cause interference in the network and affect network capacity. In addition, the UE may consume power to monitor for and decode the dedicated DCIs. Aspects provided herein may facilitate reduction of dedicated DCIs to indicate PDCCH skipping to UEs, which may help reduce the quantity of DCIs to be decoded by the UEs and help the network node reduce the number of dedicated DCIs transmitted, while facilitating the UE power savings through PDCCH skipping. A reduction in the quantity of DCI transmitted by a network node, such as a base station, may help to reduce interference in the network. Aspects provided herein may also help reduce the quantity of dedicated DCIs for PDCCH monitoring by a quantity of scheduling request (SR) that overrides PDCCH skip.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a skip component 198. In some aspects, the skip component 198 may be configured to receive, from a network node, downlink control information (DCI) including a command to skip monitoring for physical downlink control channel (PDCCH) for a period of time. In some aspects, the skip component 198 may be further configured to transmit, to the network node during the period of time, at least one scheduling request (SR) to schedule at least one physical uplink shared channel (PUSCH) transmission for uplink data transmission at the UE. In some aspects, the skip component 198 may be configured to monitor and receive at least one PDCCH transmission from the network node to schedule the at least one PUSCH transmission. In some aspects, the skip component 198 may be further configured to transmit, to the network node, the at least one PUSCH transmission. In some aspects, the skip component 198 may be configured to transmit, at an end of the uplink data transmission, an indication to skip monitoring for the PDCCH in a last PUSCH transmission of the at least one PUSCH transmission.

In certain aspects, the base station 102 may include a skip component 199. In some aspects, the skip component 199 may be configured to transmit, for a UE, DCI including a command to skip monitoring for PDCCH for a period of time. In some aspects, the skip component 199 may be further configured to receive, during the period of time, at least one SR to schedule at least one PUSCH transmission for uplink data transmission at the UE. In some aspects, the skip component 199 may be configured to transmit at least one PDCCH transmission for the UE to schedule the at least one PUSCH transmission. In some aspects, the skip component 199 may be further configured to receive the at least one PUSCH transmission. In some aspects, the skip component 199 may be further configured to receive, at an end of the uplink data transmission, an indication to skip monitoring for the PDCCH in a last PUSCH transmission of the at least one PUSCH transmission.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
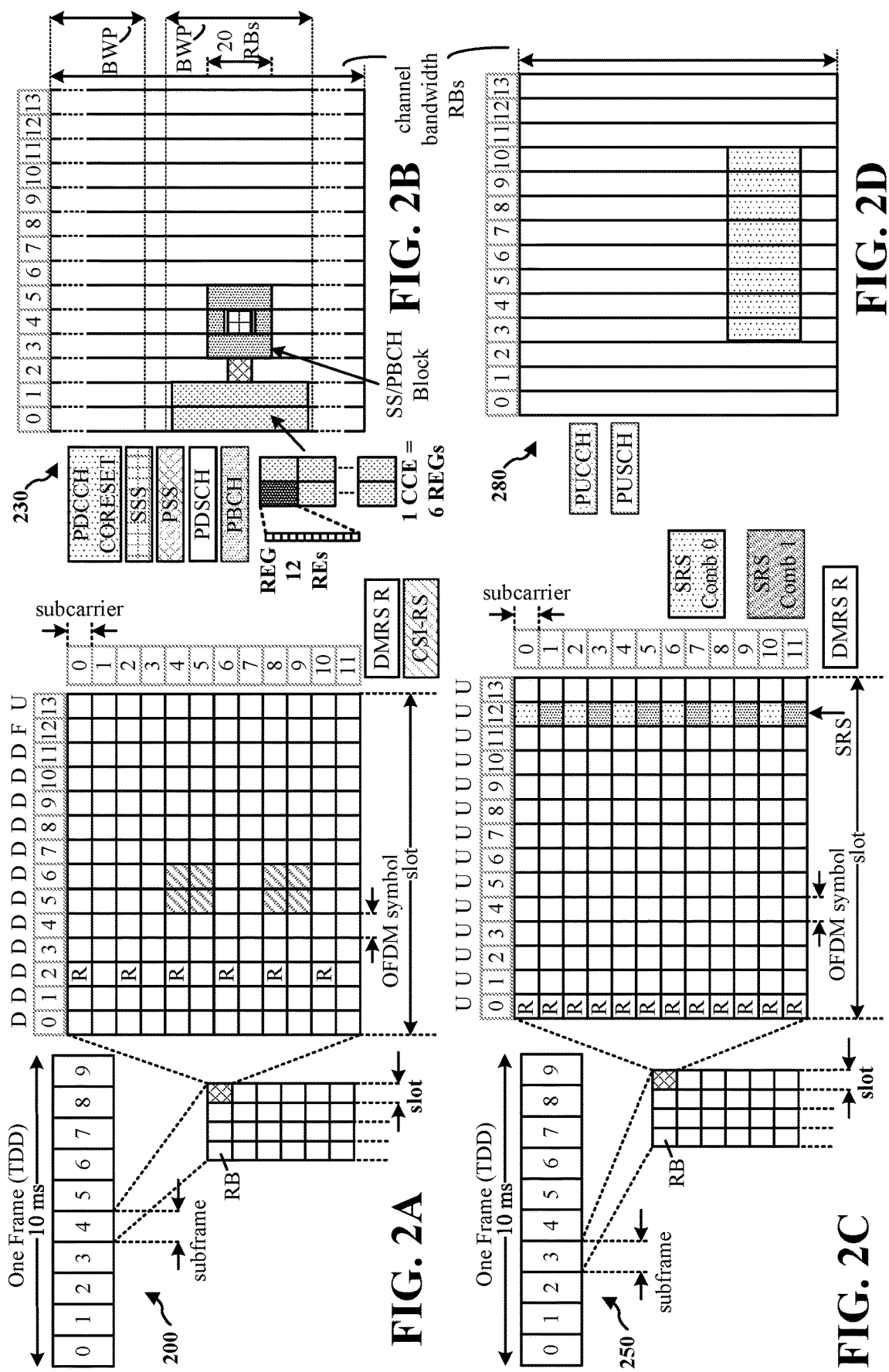
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
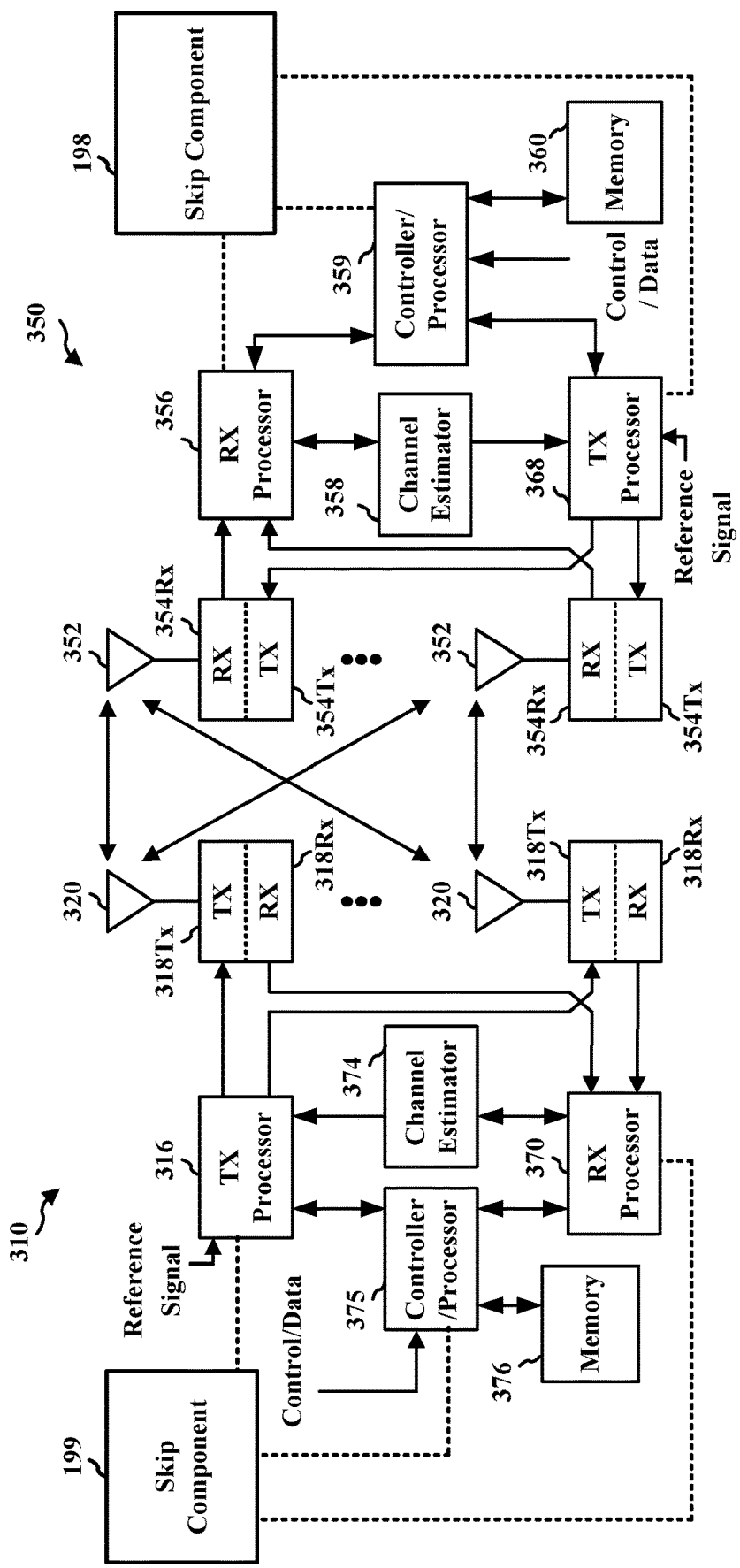
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with skip component 198 of FIG. 1.

At least one of the TX processor 316, the RX processor 370, and the controller/processor 375 may be configured to perform aspects in connection with skip component 199 of FIG. 1.

As used herein, the term "PDCCH skip feature," "PDCCH skip" or "PDCCH skipping" may refer to a UE skipping monitoring of PDCCH for a period of time (e.g., for power saving purpose). For example, during the period of time, the UE may skip monitoring for PDCCH transmissions from the network. The PDCCH skipping may be triggered by DCI dedicated for carrying a command that triggers PDCCH skipping and does not carry scheduling information for other transmission(s). In some aspects, the DCI may be referred to as "dummy DCI," because the DCI does not carry scheduling information for other transmission(s). In some aspects, the PDCCH skipping may also be triggered by a last PDSCH grant of a current transmission that includes a DCI command. The PDCCH skipping may be enabled for the UE for a particular period of time (which may be otherwise referred to as "skip duration), e.g., as indicated by the network node or the UE.

Figure 4:
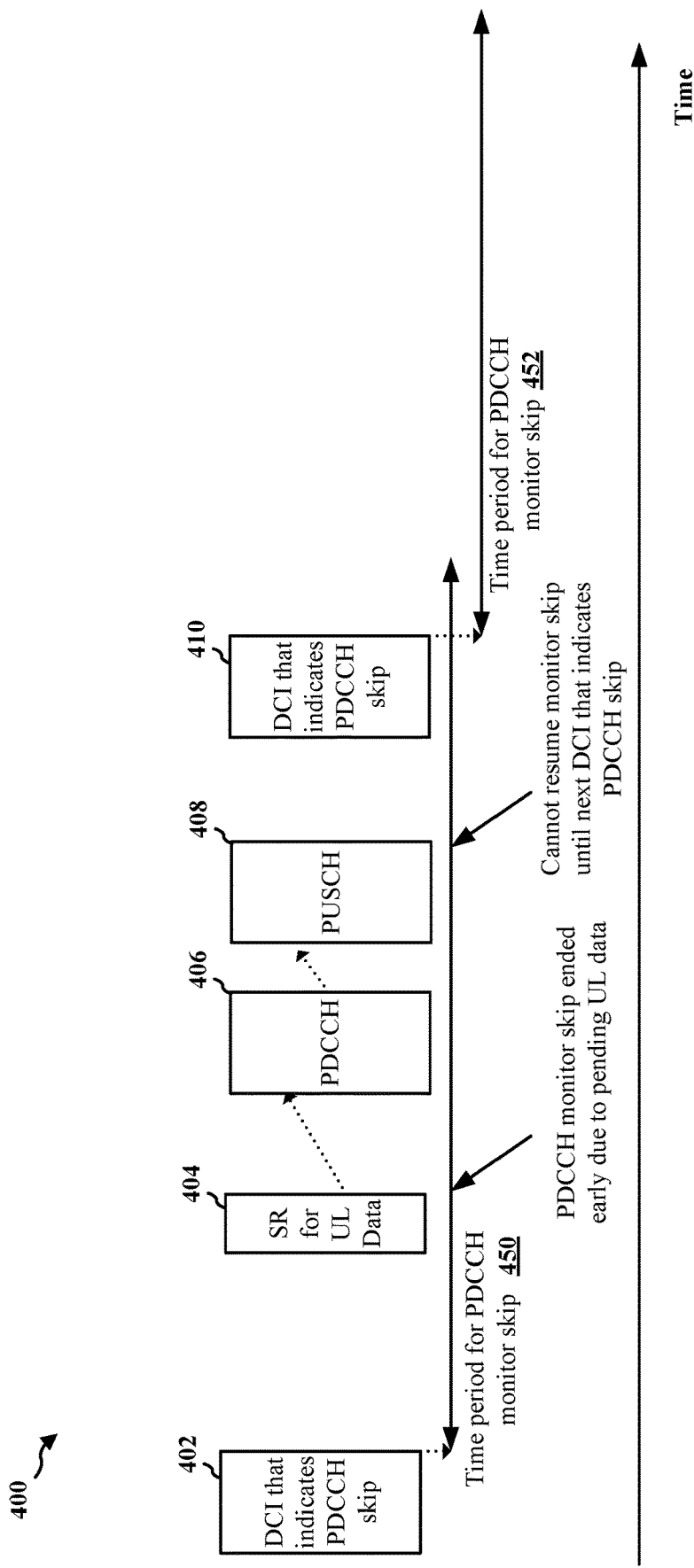
FIG. 4 is a diagram illustrating an example of a physical downlink control channel (PDCCH) skip based on dummy downlink control information (DCI), in accordance with various aspects of the present disclosure.

FIG. 4 is a diagram 400 illustrating an example of a PDCCH skip based on dummy DCI, in accordance with various aspects of the present disclosure. As illustrated in FIG. 4, a network may transmit a dedicated DCI 402 may indicate, to a UE, a PDCCH skip (e.g., indicating for the UE to skip monitoring for PDCCH) for a period of time 450. Based on the dedicated DCI 402, the UE may begin the PDCCH skip (e.g., the UE may stop monitoring, or skip monitoring, for PDCCH transmissions from the network). During the period of time 450, the UE may have pending UL data to be transmitted to the network node. Therefore, the UE may transmit an SR 404 to request resources for transmitting the uplink data, and the UE may resume monitoring for a PDCCH transmission that schedules PUSCH for the pending UL data in response to the SR. As the UE resumes PDCCH monitoring, the PDCCH skipping is interrupted. In some aspects, the UE may receive a PDCCH transmission 406 in response to the SR 404. The PDCCH transmission 406 may include scheduling information for one or more PUSCH transmission 408 to enable the UE to transmit uplink data. The UE may then transmit the PUSCH transmission 408 with the pending UL data. In some aspects, the UE may transmit more than one PUSCH transmission and/or may receive more than one PDCCH transmission 406 to transmit all of the pending UL data. In some aspects, the UE may finish transmitting the pending UL data within the period of time 450 originally indicated for PDCCH skipping. However, the UE may be unable to resume PDCCH skip until receiving a next dedicated DCI 410 that indicates PDCCH skipping for a period of time 452.

PDCCH skipping based on dedicated DCI may facilitate power saving at the UE for a large amount, e.g., 15% and 26% for skip duration of 5 and 10 milliseconds respectively. However, to facilitate such PDCCH skip, many different dedicated DCI may be transmitted for different UE which may consume added overhead resources and potentially cause interference in the network, affecting network capacity. In addition, the UEs may monitor and decode the dedicated DCIs which may consume power at the UE. Aspects provided herein may facilitate reduction of dedicated DCIs for PDCCH skipping, which may help the UE to reduce the quantity of DCIs to be decoded and help the network node reduce the number of dedicated DCIs transmitted, while facilitating the PDCCH skipping. Reduction in the quantity of dedicated DCI that network node transmits may lead to less interference in the network. Aspects provided herein may also lead to reduction in the quantity of dedicated DCIs for PDCCH monitoring by a quantity of SR that overrides PDCCH skip.

Figure 5:
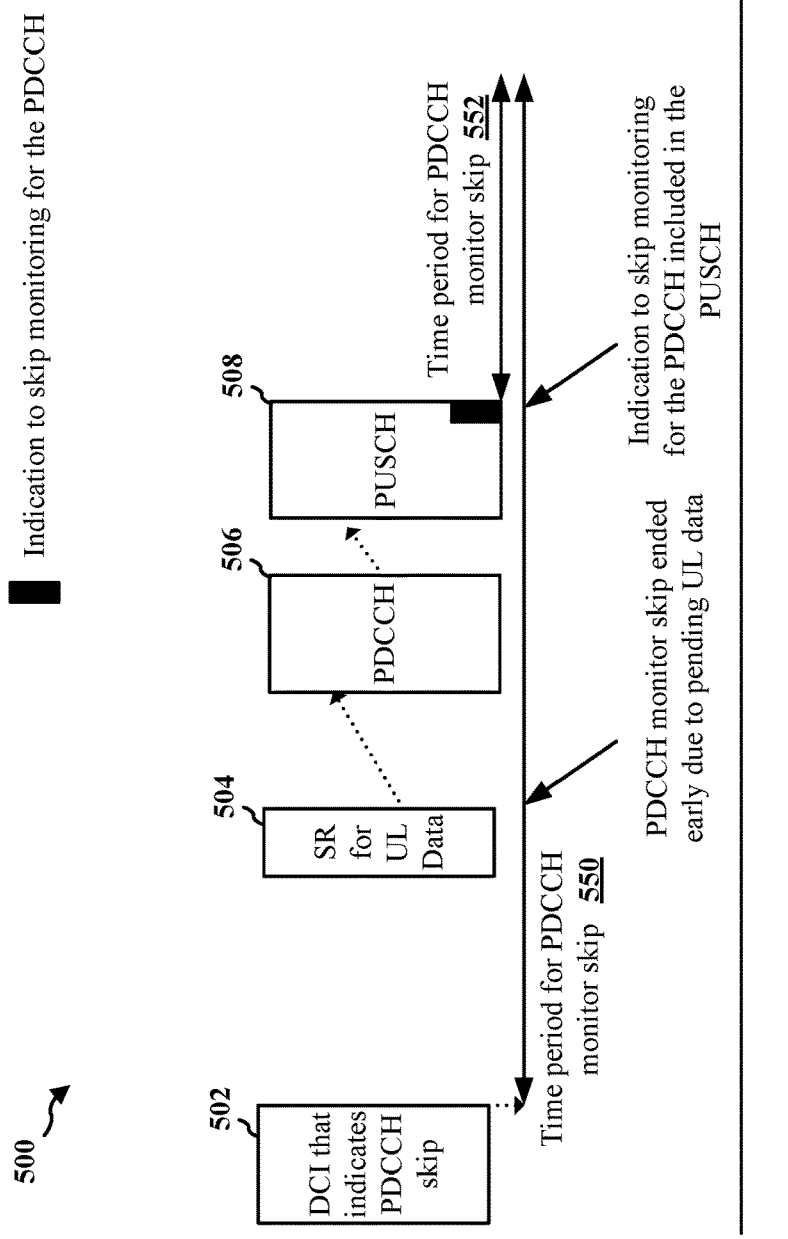
FIG. 5 is a diagram illustrating an example of a PDCCH skip based on dummy DCI where the UE continues the skip after the skip was interrupted, in accordance with various aspects of the present disclosure.

FIG. 5 is a diagram 500 illustrating an example of a PDCCH skipping based on a dummy DCI, e.g., that does not schedule uplink or downlink resources, where the UE continues to, or resumes, skipping PDCCH monitoring after the skip was interrupted, in accordance with various aspects of the present disclosure. As illustrated in FIG. 5, the network may transmit a dedicated DCI 502 to a UE to indicate for the UE to skip PDCCH monitoring for a period of time 550. Based on the dedicated DCI 502, the UE may begin PDCCH skipping (e.g., skip monitoring for PDCCH). Within the period of time 550, the UE may have pending UL data to be transmitted to the network node. Therefore, the UE may transmit an SR 504 to the network to indicate a request for resources to be allocated to the UE to transmit the uplink data. After transmitting the SR, the UE may resume monitoring for PDCCH in order to receive the PDCCH transmission that schedules PUSCH resources for the pending UL data. As the UE monitors for a PDCCH transmission (e.g., with a scheduling DCI) after transmitting the SR, the PDCCH skip is interrupted. In some aspects, the UE may receive a PDCCH transmission 506 that may be a response to the SR 504. The PDCCH transmission 506 may include scheduling information for a PUSCH transmission 508. The UE may then transmit the PUSCH transmission 508 to transmit the pending UL data. In some aspects, there may be more than one PUSCH transmission and/or more than one PDCCH transmission 506 in order for the UE to transmit all of the pending UL data at the UE. In some aspects, the UE may finish transmitting the pending UL data while still within PDCCH skipping duration (e.g., within the period of time 550 originally configured or indicated for the PDCCH skipping). The UE may transmit an indication to inform the network that the UE may resume the PDCCH skipping for a period of time 552. In some aspects, the UE may include the indication in the PUSCH transmission 508 (e.g., which may be a last PUSCH transmission for the pending UL data). The period of time 552 may end within the period of time 550.

Figure 6:
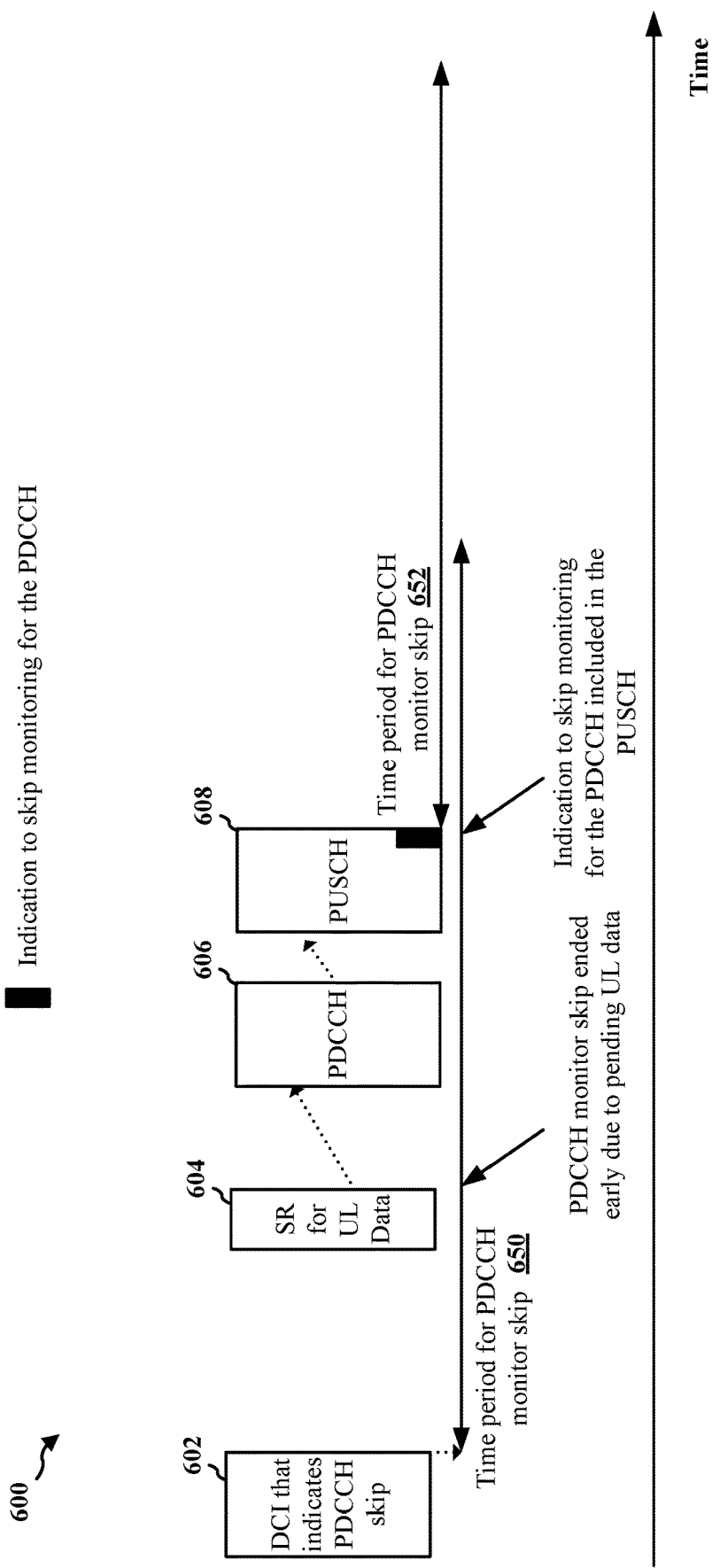
FIG. 6 is a diagram illustrating an example of a PDCCH skip based on dummy DCI where the UE continues the skip after the skip was interrupted, in accordance with various aspects of the present disclosure.

FIG. 6 is a diagram 600 illustrating an example of PDCCH skipping based on a dummy DCI (e.g., that does not schedule resources for a transmission) where the UE continues, or resumes, PDCCH skipping after the skip was interrupted, in accordance with various aspects of the present disclosure. As illustrated in FIG. 6, a network node may transmit a dedicated DCI 602 to a UE to indicate PDCCH skip for a period of time 650. Based on the dedicated DCI 602, the UE may begin PDCCH skipping (e.g., skip monitoring of PDCCH). During the period of time 650, the UE may have pending UL data to be transmitted to the network node. Therefore, the UE may transmit an SR 604 to indicate a request for resources to transmit the uplink data and may resume monitoring for PDCCH in order to receive a PDCCH transmission that schedules PUSCH resources for the pending UL data. As the UE monitors for the PDCCH in order to receive a scheduling DCI, the PDCCH skip is interrupted. In some aspects, the UE may receive a PDCCH transmission 606 in response to the SR 604. The PDCCH transmission 606 may include scheduling information, e.g., allocating, scheduling, or granting uplink resources, for PUSCH transmission 608. The UE may then transmit the PUSCH transmission 608 to transmit the pending UL data. In some aspects, the UE may transmit more than one PUSCH transmission and/or receive more than one PDCCH transmission 606 (with scheduling information) to transmit all of the pending UL data at the UE. In some aspects, the UE may finish transmitting the pending UL data within the period of time 650 originally indicated for the PDCCH skipping. The UE may transmit an indication to inform the network that the UE may resume the PDCCH skip for a period of time 652. In some aspects, the indication may be included in the PUSCH transmission 608 (e.g., which may be a last PUSCH transmission for the pending UL data). In contrast to the example in FIG. 5, as illustrated in FIG. 6, the period of time 652 may end outside, e.g., after, the period of time 650.

Figure 7:
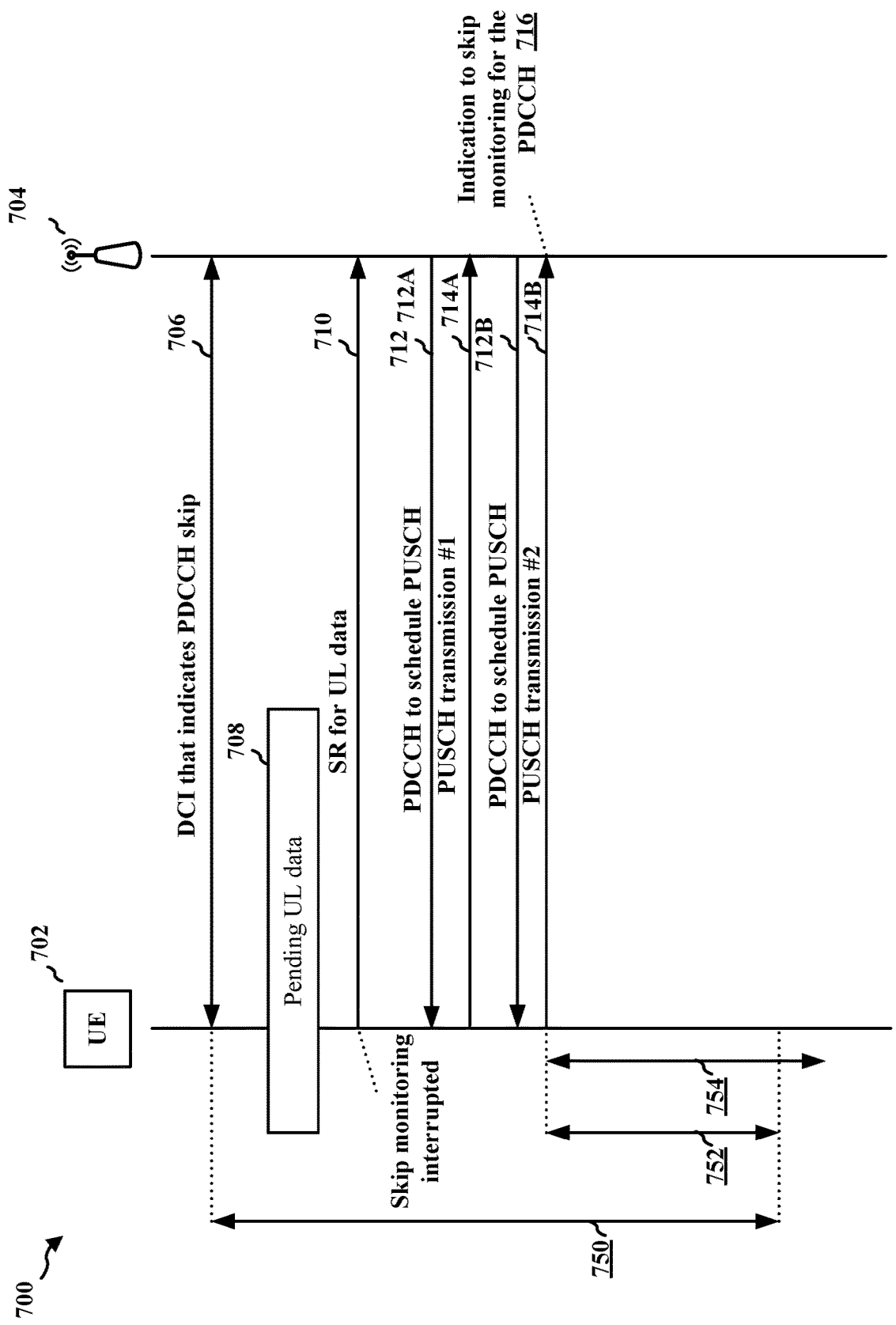
FIG. 7 is a diagram illustrating example communications between a network node and a UE, in accordance with various aspects of the present disclosure.

FIG. 7 is a diagram 700 illustrating example communications between a network node 704 and a UE 702, in accordance with various aspects of the present disclosure. In some aspects, the network node 704 may be a base station or one or more components of a base station (e.g., a CU, DU, and/or RU).

As illustrated in FIG. 7, the network node 704 may transmit DCI 706 that indicates (e.g., enabling, activating, and/or otherwise indicating) (e.g., by including a command) PDCCH skipping to the UE 702 for a period of time 750. The UE 702 may accordingly skip PDCCH monitoring upon receiving the DCI 706 that indicates the PDCCH skipping for the UE. In some aspects, the UE 702 may have pending UL data at 708. Due to the pending UL data, the UE 702 may transmit an SR 710 for the UL data, and the UE 702 may start monitoring for PDCCH transmissions due to the UE 702 expecting to receiving scheduling information for PUSCH transmission(s) for the UL data. Therefore, the PDCCH skip is interrupted. Based on receiving the SR 710 from the UE 702, the network node 704 may transmit one or more PDCCH transmissions including the PDCCH 712 to schedule at least one PUSCH transmission for the pending UL data, which may include PUSCH transmission 714A and PUSCH transmission 714B. Based on receiving the one or more PDCCH transmissions including the PDCCH 712 to schedule at least one PUSCH transmission for the pending UL data, which may include PUSCH transmission 714A and PUSCH transmission 714B, the UE 702 may transmit the UL data in at least one PUSCH transmission for the pending UL data, which may include PUSCH transmission 714A and PUSCH transmission 714B. In some aspects, the at least one PUSCH transmission for the pending UL data, which may include PUSCH transmission 714A and PUSCH transmission 714B, may be scheduled by a same PDCCH transmission by the network node 704. In some aspects, the at least one PUSCH transmission for the pending UL data, which may include PUSCH transmission 714A and PUSCH transmission 714B, may be scheduled by different PDCCH transmissions (e.g., 712A and 712B). In some aspects, each PUSCH transmission of the at least one PUSCH transmission for the pending UL data, which may include PUSCH transmission 714A and PUSCH transmission 714B, may be scheduled by a different PDCCH transmission (e.g., 712A or 712B) by the network node 704. In some aspects, the different PDCCH transmissions by the network node 704 may be triggered by a same SR. In some aspects, the different PDCCH transmissions by the network node 704 may be triggered by different SRs. In some aspects, each of the different PDCCH transmissions by the network node 704 may be triggered by a different SR.

In some aspects, at an end of a last PUSCH transmission (e.g., 714B) for carrying the pending UL data, the UE 702 may transmit (e.g., include in the last PUSCH transmission) an indication 716 indicating that the UE 702 would continue the PDCCH skip for a period of time (e.g., 752 or 754). In some aspects, the UE 702 would continue the PDCCH skip for a period of time 752 that ends within the previous configured period of time 750 for PDCCH skip (configured by the DCI 706). In some aspects, the UE 702 would continue the PDCCH skip for a period of time 754 that ends outside the previous configured period of time 750 for PDCCH skip (configured by the DCI 706). In some aspects, the indication 716 indicating that the UE 702 would continue the PDCCH skip for a period of time may indicate that the UE 702 may immediately start skipping monitoring for PDCCH for a quantity of slots.

Figure 8:
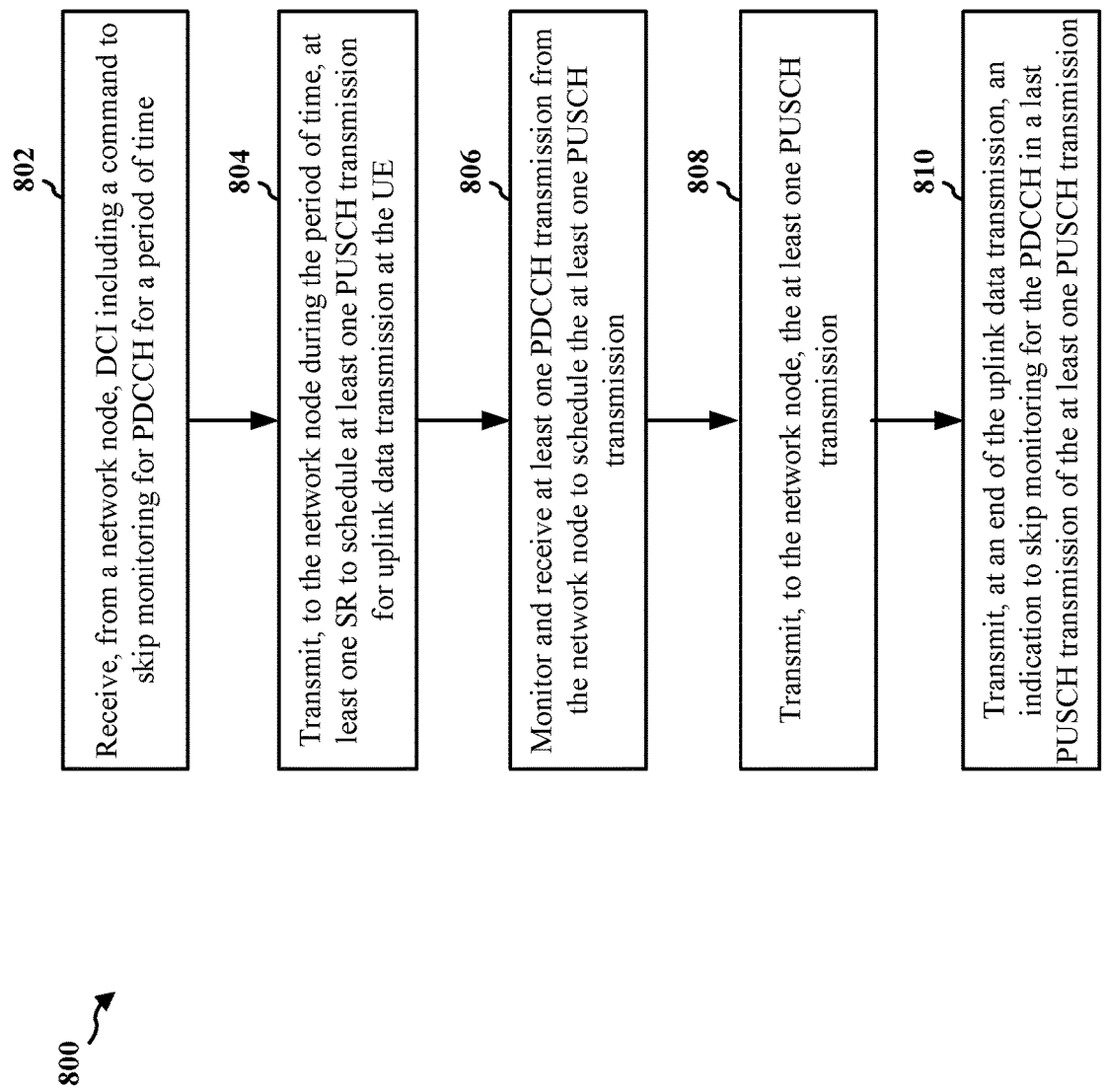
FIG. 8 is a flowchart of a method of wireless communication, in accordance with various aspects of the present disclosure.

FIG. 8 is a flowchart 800 of a method of wireless communication. The method may be performed by a UE (e.g., the UE 104, the UE 702; the apparatus 1004). The method may lead to less signaling overhead for a PDCCH skip feature at a UE by reducing the amount of dedicated DCI used for the PDCCH skip feature, which may in turn facilitate less resources used for the PDCCH skip feature and power saving at a UE.

At 802, the UE may receive, from a network node, DCI including a command to skip monitoring for PDCCH for a period of time. For example, the UE 702 may receive, from a network node 704, DCI (e.g., 706) including a command to skip monitoring for PDCCH for a period of time (e.g., 750). In some aspects, 802 may be performed by skip component 198. In some aspects, the DCI indicates the period of time as a PDCCH skipping duration value associated with the DCI. In some aspects, the DCI selects the period of time among a list of PDCCH skipping period configured via RRC. In some aspects, the period of time is not longer than a discontinuous reception (DRX) inactivity timer. In some aspects, the DCI is dedicated for carrying the command, and where the DCI does not carry scheduling information for uplink transmission or downlink transmission. In some aspects, the command to skip monitoring for the PDCCH is based on a battery level or a power saving mode associated with the UE.

At 804, the UE may transmit, to the network node during the period of time, at least one SR to schedule at least one PUSCH transmission for uplink data transmission at the UE. For example, the UE 702 may transmit, to the network node 704 during the period of time (e.g., 750), at least one SR (e.g., 710) to schedule at least one PUSCH transmission for uplink data transmission at the UE. In some aspects, 804 may be performed by skip component 198.

At 806, the UE may monitor and receive at least one PDCCH transmission from the network node to schedule the at least one PUSCH transmission. For example, the UE 702 may monitor and receive at least one PDCCH transmission (e.g., 712) from the network node to schedule the at least one PUSCH transmission (e.g., 714A or 714B). In some aspects, 806 may be performed by skip component 198.

At 808, the UE may transmit, to the network node, the at least one PUSCH transmission. For example, the UE 702 may transmit, to the network node 704, the at least one PUSCH transmission (e.g., 714A or 714B). In some aspects, 808 may be performed by skip component 198.

At 810, the UE may transmit, at an end of the uplink data transmission, an indication to skip monitoring for the PDCCH in a last PUSCH transmission of the at least one PUSCH transmission. For example, the UE 702 may transmit, at an end of the uplink data transmission, an indication (e.g., 716) to skip monitoring for the PDCCH in a last PUSCH transmission of the at least one PUSCH transmission. In some aspects, 810 may be performed by skip component 198. In some aspects, the indication to skip monitoring for the PDCCH indicates a duration associated with skip monitoring for the PDCCH, and where an end of the duration (e.g., 754) is outside the period of time. In some aspects, the indication to skip monitoring for the PDCCH indicates a duration associated with skip monitoring for the PDCCH, and where an end of the duration (e.g., 752) is within the period of time. In some aspects, the command to skip monitoring for the PDCCH is based on a battery level or a power saving mode associated with the UE. In some aspects, the command is included in a PDCCH monitoring adaptation field including at least one bit indicating skip monitoring for the PDCCH for the period of time. In some aspects, to transmit the indication to skip monitoring for the PDCCH, the UE may transmit the indication to skip monitoring for the PDCCH based on a battery level or a power saving mode associated with the UE.

Figure 9:
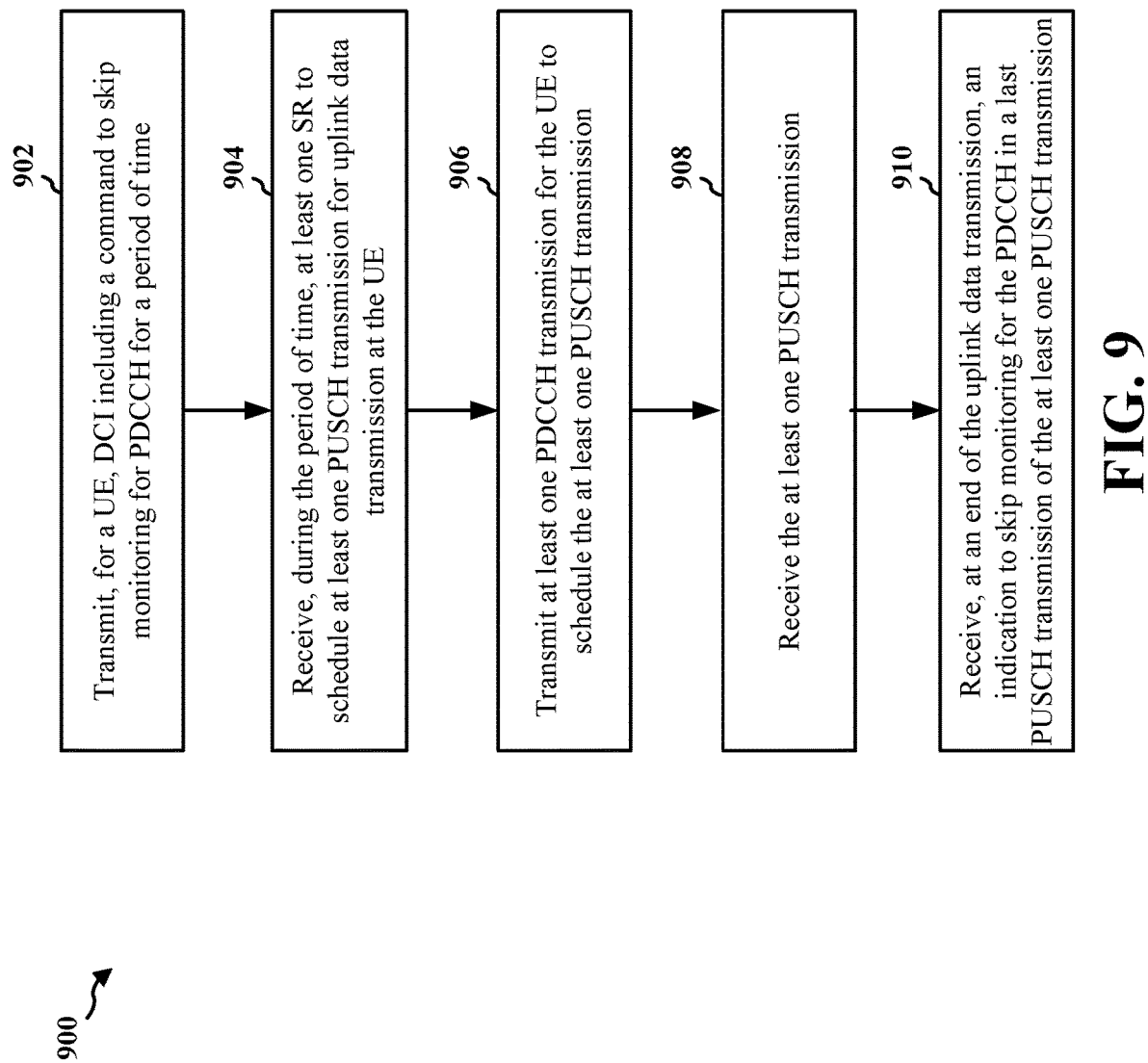
FIG. 9 is a flowchart of a method of wireless communication, in accordance with various aspects of the present disclosure.

FIG. 9 is a flowchart 900 of a method of wireless communication. The method may be performed by a network node (e.g., the base station 102, the network node 704, the network entity 1002, the network entity 1102). The method may lead to less signaling overhead for a PDCCH skip feature at a UE by reducing the amount of dedicated DCI used for the PDCCH skip feature, which may in turn facilitate less resources used for the PDCCH skip feature and power saving at a UE.

At 902, the network node may transmit, for a UE, DCI including a command to skip monitoring for PDCCH for a period of time. For example, the network node 704 may transmit, for a UE 702, DCI (e.g., 706) including a command to skip monitoring for PDCCH for a period of time (e.g., 750). In some aspects, 902 may be performed by skip component 199. In some aspects, the DCI indicates the period of time as a PDCCH skipping duration value associated with the DCI. In some aspects, the DCI selects the period of time among a list of PDCCH skipping period configured via RRC. In some aspects, the period of time is not longer than a DRX inactivity timer. In some aspects, the DCI is dedicated for carrying the command, and where the DCI does not carry scheduling information for uplink transmission or downlink transmission. In some aspects, to transmit the DCI including the command to skip monitoring for the PDCCH, the network node may transmit the DCI including the command to skip monitoring for the PDCCH based on a battery level or a power saving mode associated with the UE.

At 904, the network node may receive, during the period of time, at least one SR to schedule at least one PUSCH transmission for uplink data transmission at the UE. For example, the network node 704 may receive, during the period of time, at least one SR (e.g., 710) to schedule at least one PUSCH transmission for uplink data transmission at the UE. In some aspects, 904 may be performed by skip component 199.

At 906, the network node may transmit at least one PDCCH transmission for the UE to schedule the at least one PUSCH transmission. For example, the network node 704 may transmit at least one PDCCH transmission (e.g., 712) for the UE to schedule the at least one PUSCH transmission (e.g., 714A or 714B). In some aspects, 906 may be performed by skip component 199.

At 908, the network node may receive the at least one PUSCH transmission. For example, the network node 704 may receive the at least one PUSCH transmission (e.g., 714A or 714B). In some aspects, 908 may be performed by skip component 199.

At 910, the network node may receive, at an end of the uplink data transmission, an indication to skip monitoring for the PDCCH in a last PUSCH transmission of the at least one PUSCH transmission. For example, the network node 704 may receive, at an end of the uplink data transmission, an indication (e.g., 716) to skip monitoring for the PDCCH in a last PUSCH transmission of the at least one PUSCH transmission. In some aspects, 910 may be performed by skip component 199. In some aspects, the indication to skip monitoring for the PDCCH indicates a duration associated with skip monitoring for the PDCCH, and where an end of the duration is outside the period of time. In some aspects, the indication to skip monitoring for the PDCCH indicates a duration associated with skip monitoring for the PDCCH, and where an end of the duration is within the period of time. In some aspects, the command to skip monitoring for the PDCCH is based on a battery level or a power saving mode associated with the UE. In some aspects, the command is included in a PDCCH monitoring adaptation field including at least one bit indicating skip monitoring for the PDCCH for the period of time. In some aspects, the indication to skip monitoring for the PDCCH is based on a battery level or a power saving mode associated with the UE.

Figure 10:
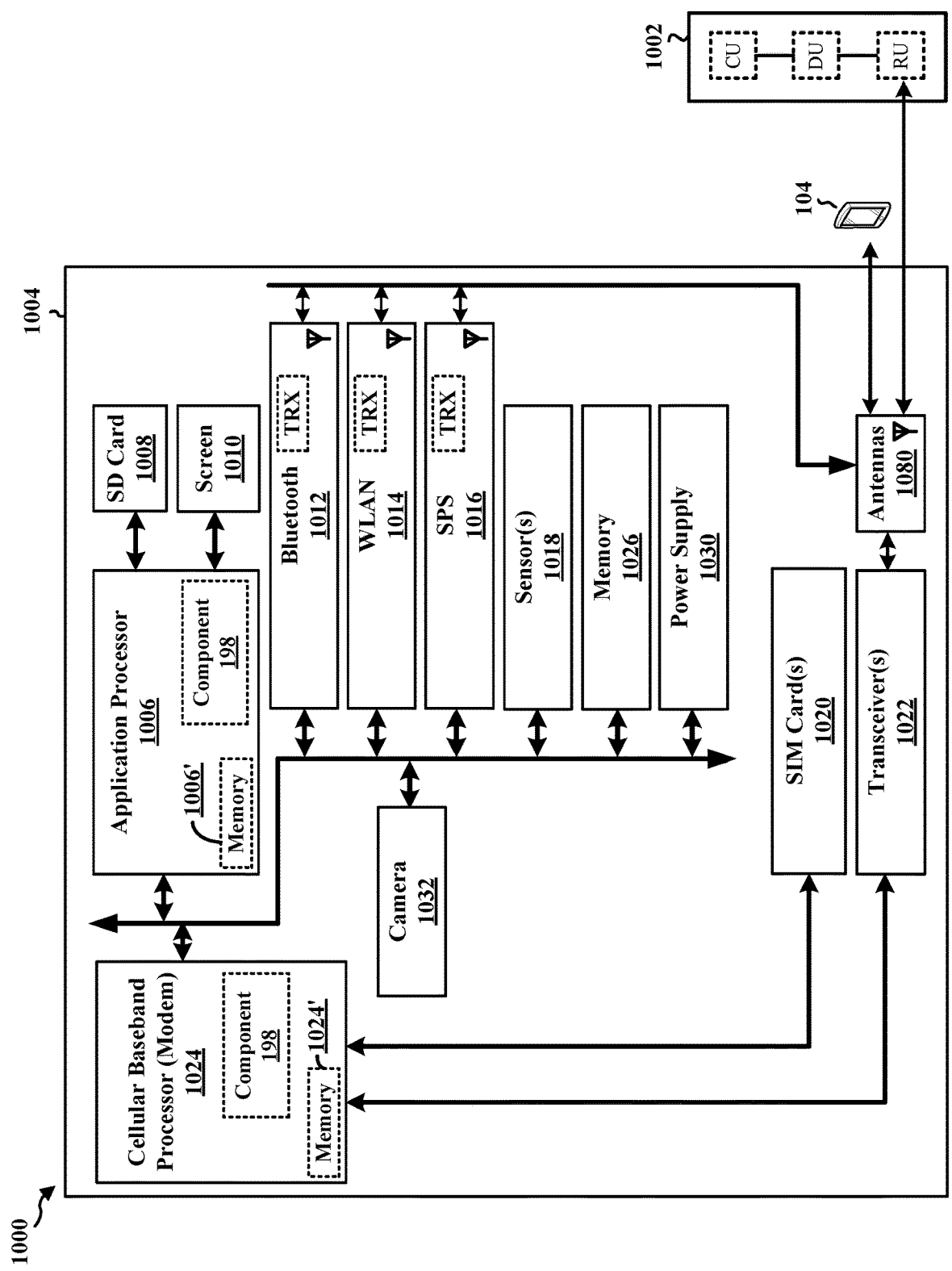
FIG. 10 is a diagram illustrating an example of a hardware implementation for an example apparatus and/or network entity, in accordance with various aspects of the present disclosure.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) 1024 communicates through the transceiver(s) 1022 via one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory.

The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/ application processor(s) 1006 when executing software. The cellular baseband processor(s) 1024/application processor(s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor (s) 1024 and/or the application processor(s) 1006, and in another configuration, the apparatus 1004 may be the entire UE (e.g., see UE 350 of FIG. 3) and include the additional modules of the apparatus 1004.

As discussed supra, the skip component 198 may be configured to receive, from a network node, downlink control information (DCI) including a command to skip monitoring for physical downlink control channel (PDCCH) for a period of time. In some aspects, the skip component 198 may be further configured to transmit, to the network node during the period of time, at least one scheduling request (SR) to schedule at least one physical uplink shared channel (PUSCH) transmission for uplink data transmission at the UE. In some aspects, the skip component 198 may be configured to monitor and receive at least one PDCCH transmission from the network node to schedule the at least one PUSCH transmission. In some aspects, the skip component 198 may be further configured to transmit, to the network node, the at least one PUSCH transmission. In some aspects, the skip component 198 may be configured to transmit, at an end of the uplink data transmission, an indication to skip monitoring for the PDCCH in a last PUSCH transmission of the at least one PUSCH transmission. The skip component 198 may be within the cellular baseband processor(s) 1024, the application processor(s) 1006, or both the cellular baseband processor(s) 1024 and the application processor(s) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for receiving, from a network node, DCI including a command to skip monitoring for PDCCH for a period of time. In some aspects, the apparatus 1004 may include means for transmitting, to the network node during the period of time, at least one SR to schedule at least one PUSCH transmission for uplink data transmission at the UE. In some aspects, the apparatus 1004 may include means for monitoring and receiving at least one PDCCH transmission from the network node to schedule the at least one PUSCH transmission. In some aspects, the apparatus 1004 may include means for transmitting, to the network node, the at least one PUSCH transmission. In some aspects, the apparatus 1004 may include means for transmitting, at an end of the uplink data transmission, an indication to skip monitoring for the PDCCH in a last PUSCH transmission of the at least one PUSCH transmission. In some aspects, the apparatus 1004 may include means for transmitting the indication to skip monitoring for the PDCCH based on a battery level or a power saving mode associated with the UE. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
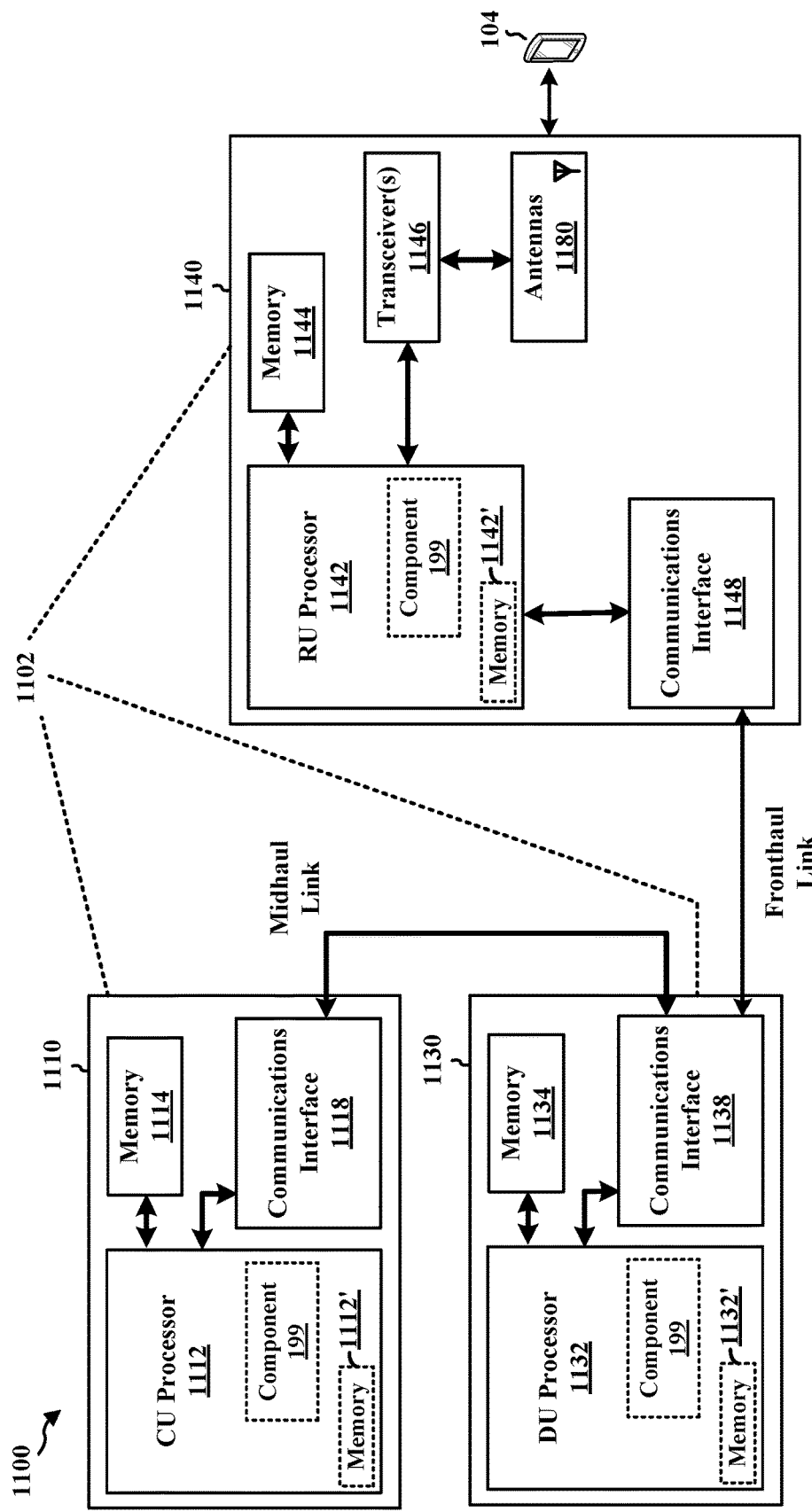
FIG. 11 is a diagram illustrating an example of a hardware implementation for an example network entity, in accordance with various aspects of the present disclosure.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor 1112. The CU processor(s) 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor 1132. The DU processor(s) 1132 may include on-chip memory 1132'. In some aspects, the DU 1130 may further include additional memory modules 1134 and a communications interface 1138. The DU 1130 communicates with the RU 1140 through a fronthaul link. The RU 1140 may include at least one RU processor 1142. The RU processor(s) 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the skip component 199 may be configured to transmit, for a UE, DCI including a command to skip monitoring for PDCCH for a period of time. In some aspects, the skip component 199 may be further configured to receive, during the period of time, at least one SR to schedule at least one PUSCH transmission for uplink data transmission at the UE. In some aspects, the skip component 199 may be configured to transmit at least one PDCCH transmission for the UE to schedule the at least one PUSCH transmission. In some aspects, the skip component 199 may be further configured to receive the at least one PUSCH transmission. In some aspects, the skip component 199 may be further configured to receive, at an end of the uplink data transmission, an indication to skip monitoring for the PDCCH in a last PUSCH transmission of the at least one PUSCH transmission. The skip component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 may include means for transmitting, for a UE, DCI including a command to skip monitoring for PDCCH for a period of time. In some aspects, the network entity 1102 may include means for receiving, during the period of time, at least one SR to schedule at least one PUSCH transmission for uplink data transmission at the UE. In some aspects, the network entity 1102 may include means for transmitting at least one PDCCH transmission for the UE to schedule the at least one PUSCH transmission. In some aspects, the network entity 1102 may include means for receiving the at least one PUSCH transmission. In some aspects, the network entity 1102 may include means for receiving, at an end of the uplink data transmission, an indication to skip monitoring for the PDCCH in a last PUSCH transmission of the at least one PUSCH transmission. In some aspects, the network entity 1102 may include means for transmitting the DCI including the command to skip monitoring for the PDCCH based on a battery level or a power saving mode associated with the UE. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a UE, including: receiving, from a network node, DCI including a command to skip monitoring for PDCCH for a period of time; transmitting, to the network node during the period of time, at least one SR to schedule at least one PUSCH transmission for uplink data transmission at the UE;

monitoring and receiving at least one PDCCH transmission from the network node to schedule the at least one PUSCH transmission; transmitting, to the network node, the at least one PUSCH transmission; and transmitting, at an end of the uplink data transmission, an indication to skip monitoring for the PDCCH in a last PUSCH transmission of the at least one PUSCH transmission.

Aspect 2 is the method of aspect 1, where the indication to skip monitoring for the PDCCH indicates a duration associated with skip monitoring for the PDCCH, and where an end of the duration is outside the period of time.

Aspect 3 is the method of aspect 1, where the indication to skip monitoring for the PDCCH indicates a duration associated with skip monitoring for the PDCCH, and where an end of the duration is within the period of time.

Aspect 4 is the method of any of aspects 1-3, where the DCI indicates the period of time as a PDCCH skipping duration value associated with the DCI.

Aspect 5 is the method of any of aspects 1-4, where the DCI selects the period of time among a list of PDCCH skipping period configured via radio resource control (RRC).

Aspect 6 is the method of any of aspects 1-5, where the period of time is not longer than a discontinuous reception (DRX) inactivity timer.

Aspect 7 is the method of any of aspects 1-6, where the command to skip monitoring for the PDCCH is based on a battery level or a power saving mode associated with the UE.

Aspect 8 is the method of any of aspects 1-7, where transmitting the indication to skip monitoring for the PDCCH includes: transmitting the indication to skip monitoring for the PDCCH based on a battery level or a power saving mode associated with the UE.

Aspect 9 is the method of any of aspects 1-8, where the command is included in a PDCCH monitoring adaptation field including at least one bit indicating skip monitoring for the PDCCH for the period of time.

Aspect 10 is the method of any of aspects 1-9, where the DCI is dedicated for carrying the command, and where the DCI does not carry scheduling information for uplink transmission or downlink transmission.

Aspect 11 is a method for wireless communication performed by a network node, including: transmitting, for a UE, DCI including a command to skip monitoring for PDCCH for a period of time; receiving, during the period of time, at least one SR to schedule at least one PUSCH transmission for uplink data transmission at the UE; transmitting at least one PDCCH transmission for the UE to schedule the at least one PUSCH transmission; receiving the at least one PUSCH transmission; and receiving, at an end of the uplink data transmission, an indication to skip monitoring for the PDCCH in a last PUSCH transmission of the at least one PUSCH transmission.

Aspect 12 is the method of aspects 11, where the indication to skip monitoring for the PDCCH indicates a duration associated with skip monitoring for the PDCCH, and where an end of the duration is outside the period of time.

Aspect 13 is the method of aspect 11, where the indication to skip monitoring for the PDCCH indicates a duration associated with skip monitoring for the PDCCH, and where an end of the duration is within the period of time.

Aspect 14 is the method of any of aspects 11-13, where the DCI indicates the period of time as a PDCCH skipping duration value associated with the DCI.

Aspect 15 is the method of any of aspects 11-14, where the DCI selects the period of time among a list of PDCCH skipping period configured via radio resource control (RRC).

Aspect 16 is the method of any of aspects 11-15, where the period of time is not longer than a discontinuous reception (DRX) inactivity timer.

Aspect 17 is the method of any of aspects 11-16, where transmitting the DCI including the command to skip monitoring for the PDCCH comprises: transmitting the DCI including the command to skip monitoring for the PDCCH based on a battery level or a power saving mode associated with the UE.

Aspect 18 is the method of any of aspects 11-17, where the indication to skip monitoring for the PDCCH is based on a battery level or a power saving mode associated with the UE.

Aspect 19 is the method of any of aspects 11-18, where the command is included in a PDCCH monitoring adaptation field including at least one bit indicating skip monitoring for the PDCCH for the period of time.

Aspect 20 is the method of any of aspects 11-19, where the DCI is dedicated for carrying the command, and where the DCI does not carry scheduling information for uplink transmission or downlink transmission.

Aspect 21 is an apparatus for wireless communication at a UE including at least one memory and at least one processor coupled to the at least one memory and, based at least in part on information stored in the at least one memory, the at least one processor is configured, individually or in combination, to implement any of aspects 1 to 10.

Aspect 22 is the apparatus of aspect 21, further including one or more transceivers or one or more antennas coupled to the at least one processor.

Aspect 23 is an apparatus for wireless communication at a wireless device including means for implementing any of aspects 1 to 10.

Aspect 24 is a computer-readable medium (e.g., a non-transitory computer-readable medium) storing computer executable code, where the code when executed by at least one processor causes the at least one processor to implement any of aspects 1 to 10.

Aspect 25 is an apparatus for wireless communication at a network node including at least one memory and at least one processor coupled to the at least one memory and, based at least in part on information stored in the at least one memory, the at least one processor is configured, individually or in combination, to implement any of aspects 11 to 20.

Aspect 26 is the apparatus of aspect 25, further including one or more transceivers or one or more antennas coupled to the at least one processor.

Aspect 27 is an apparatus for wireless communication at a wireless device including means for implementing any of aspects 11 to 20.

Aspect 28 is a computer-readable medium (e.g., a non-transitory computer-readable medium) storing computer executable code, where the code when executed by at least one processor causes the at least one processor to implement any of aspects 11 to 20.

What is claimed is:
1. An apparatus for wireless communication at a user equipment (UE), comprising:
at least one memory; and
at least one processor coupled to the at least one memory and, based at least in part on information stored in the at least one memory, the at least one processor, individually or in any combination, is configured to cause the UE to:
receive, from a network node, downlink control information (DCI) comprising a command to skip monitoring for physical downlink control channel (PDCCH) for a period of time;
transmit, to the network node during the period of time, at least one scheduling request (SR) to schedule at least one physical uplink shared channel (PUSCH) transmission for uplink data transmission at the UE;
monitor and receive at least one PDCCH transmission from the network node to schedule the at least one PUSCH transmission;
transmit, to the network node, the at least one PUSCH transmission; and
transmit, at an end of the uplink data transmission, an indication to skip monitoring for the PDCCH in a last PUSCH transmission of the at least one PUSCH transmission.

2. The apparatus of claim 1, wherein the indication to skip monitoring for the PDCCH indicates a duration associated with skip monitoring for the PDCCH, and wherein the duration ends after the period of time.

3. The apparatus of claim 1, wherein the indication to skip monitoring for the PDCCH indicates a duration associated with skip monitoring for the PDCCH, and wherein the duration ends within the period of time.

4. The apparatus of claim 1, wherein the DCI indicates the period of time as a PDCCH skipping duration value associated with the DCI.

5. The apparatus of claim 1, wherein the DCI selects the period of time among a list of PDCCH skipping period configured via radio resource control (RRC).

6. The apparatus of claim 1, wherein the period of time is not longer than a discontinuous reception (DRX) inactivity timer.

7. The apparatus of claim 1, wherein the command to skip monitoring for the PDCCH is based on a battery level or a power saving mode associated with the UE.

8. The apparatus of claim 1, wherein to transmit the indication to skip monitoring for the PDCCH, the at least one processor, individually or in any combination, is configured to cause the UE to:
transmit the indication to skip monitoring for the PDCCH based on a battery level or a power saving mode associated with the UE.

9. The apparatus of claim 1, wherein the command is included in a PDCCH monitoring adaptation field comprising at least one bit indicating skip monitoring for the PDCCH for the period of time.

10. The apparatus of claim 1, wherein the DCI is dedicated for carrying the command, and wherein the DCI does not carry scheduling information for uplink transmission or downlink transmission.

11. An apparatus for wireless communication at a network node, comprising:
at least one memory; and
at least one processor coupled to the at least one memory and, based at least in part on information stored in the at least one memory, the at least one processor, individually or in any combination, is configured to cause the network node to:
transmit, for a user equipment (UE), downlink control information (DCI) comprising a command to skip monitoring for physical downlink control channel (PDCCH) for a period of time;
receive, during the period of time, at least one scheduling request (SR) to schedule at least one physical uplink shared channel (PUSCH) transmission for uplink data transmission at the UE;
transmit at least one PDCCH transmission for the UE to schedule the at least one PUSCH transmission;
receive the at least one PUSCH transmission; and
receive, at an end of the uplink data transmission, an indication to skip monitoring for the PDCCH in a last PUSCH transmission of the at least one PUSCH transmission.

12. The apparatus of claim 11, wherein the indication to skip monitoring for the PDCCH indicates a duration associated with skip monitoring for the PDCCH, and wherein the duration ends outside the period of time.

13. The apparatus of claim 11, wherein the indication to skip monitoring for the PDCCH indicates a duration associated with skip monitoring for the PDCCH, and wherein the duration ends within the period of time.

14. The apparatus of claim 11, wherein the DCI indicates the period of time as a PDCCH skipping duration value associated with the DCI.

15. The apparatus of claim 11, wherein the DCI selects the period of time among a list of PDCCH skipping period configured via radio resource control (RRC).

16. The apparatus of claim 11, wherein the period of time is not longer than a discontinuous reception (DRX) inactivity timer.

17. The apparatus of claim 11, wherein to transmit the DCI comprising the command to skip monitoring for the PDCCH, the at least one processor, individually or in any combination, is configured to cause the network node to:
transmit the DCI comprising the command to skip monitoring for the PDCCH based on a battery level or a power saving mode associated with the UE.

18. The apparatus of claim 11, wherein the indication to skip monitoring for the PDCCH is based on a battery level or a power saving mode associated with the UE.

19. The apparatus of claim 11, wherein the command is included in a PDCCH monitoring adaptation field comprising at least one bit indicating skip monitoring for the PDCCH for the period of time.

20. The apparatus of claim 11, wherein the DCI is dedicated for carrying the command, and wherein the DCI does not carry scheduling information for uplink transmission or downlink transmission.

21. A method for wireless communication performed by a user equipment (UE), comprising:
receiving, from a network node, downlink control information (DCI) comprising a command to skip monitoring for physical downlink control channel (PDCCH) for a period of time;
transmitting, to the network node during the period of time, at least one scheduling request (SR) to schedule at least one physical uplink shared channel (PUSCH) transmission for uplink data transmission at the UE;
monitoring and receiving at least one PDCCH transmission from the network node to schedule the at least one PUSCH transmission;
transmitting, to the network node, the at least one PUSCH transmission; and
transmitting, at an end of the uplink data transmission, an indication to skip monitoring for the PDCCH in a last PUSCH transmission of the at least one PUSCH transmission.

22. The method of claim 21, wherein the indication to skip monitoring for the PDCCH indicates a duration associated with skip monitoring for the PDCCH, and wherein the duration ends outside the period of time.

23. The method of claim 21, wherein the indication to skip monitoring for the PDCCH indicates a duration associated with skip monitoring for the PDCCH, and wherein the duration ends within the period of time.

24. The method of claim 21, wherein the DCI indicates the period of time as a PDCCH skipping duration value associated with the DCI.

25. The method of claim 21, wherein the DCI selects the period of time among a list of PDCCH skipping period configured via radio resource control (RRC).

26. The method of claim 21, wherein the period of time is not longer than a discontinuous reception (DRX) inactivity timer.

27. The method of claim 21, wherein the command to skip monitoring for the PDCCH is based on a battery level or a power saving mode associated with the UE.

28. The method of claim 21, wherein transmitting the indication to skip monitoring for the PDCCH comprises:
    transmitting the indication to skip monitoring for the PDCCH based on a battery level or a power saving mode associated with the UE.

29. The method of claim 21, wherein the command is included in a PDCCH monitoring adaptation field comprising at least one bit indicating skip monitoring for the PDCCH for the period of time.

30. A method for wireless communication performed by a network node, comprising:
    transmitting, for a user equipment (UE), downlink control information (DCI) comprising a command to skip monitoring for physical downlink control channel (PDCCH) for a period of time;
    receiving, during the period of time, at least one scheduling request (SR) to schedule at least one physical uplink shared channel (PUSCH) transmission for uplink data transmission at the UE;
    transmitting at least one PDCCH transmission for the UE to schedule the at least one PUSCH transmission;
    receiving the at least one PUSCH transmission; and
    receiving, at an end of the uplink data transmission, an indication to skip monitoring for the PDCCH in a last PUSCH transmission of the at least one PUSCH transmission.

* * * * *